United States Patent Office 2,943,078
Patented June 28, 1960

2,943,078

CHLOROPRENE POLYMERS CONTAINING A THIO PYRIMIDINE ACCELERATOR

Jack C. Bacon, Noroton Heights, Conn., assignor to R. T. Vanderbilt Company, Inc., New York, N.Y., a corporation of New York No Drawing. Filed Feb. 26, 1957, Ser. No. 642,368

8 Claims. (Cl. 260—79.5)

The present invention relates to the vulcanization of chloroprene polymers containing a novel accelerator and especially to the vulcanization of the chloroprene polymer known as neoprene type W.

Chloroprene polymers or neoprene are polymers of 2-chloro-1,3-butadiene (chloroprene) and copolymers of chloroprene with dienes or vinyl compounds in which chloroprene comprises the predominant monomer. These polymers or copolymers are usually made in aqueous emulsions and are available to the rubber trade under such names as GR-M, neoprene type GN, neoprene type GNA, neoprene type FR, neoprene type E, neoprene type K, neoprene type KNR, neoprene type W, and neoprene type WRT. The various types of polychloroprene or neoprene differ one from the other in the modifier used in controlling the degree of polymerization of chloroprene, typical modifiers being sulfur, sulfur dioxide, hydrogen sulfide, mercaptans, iodine compounds and aromatic azo compounds. The chloroprene polymer which is currently finding wide commercial acceptance because of its uniformity in molecular weight distribution and useful properties is neoprene type W, a stabilized chloroprene polymer containing no sulfur, thiuram disulfide, or other compound capable of decomposing to liberate free sulfur or form vulcanization accelerators.

Polychloroprenes differ greatly from other synthetic rubbers and from natural rubber in the manner in which they can be vulcanized. In general, excellent vulcanizates may be obtained from polychloroprenes by incorporating certain metallic oxides, such as zinc oxide and magnesia, into the plastic polychloroprene and heating to effect vulcanization. For certain applications litharge is recommended for use in place of the zinc oxide and magnesia, while for some types sulfur is recommended but is not necessary to effect vulcanization.

When a more rapid rate of cure is desired than can be obtained by the use of these metallic oxides alone, it has been the custom of the rubber trade to employ certain organic compounds as accelerators in conjunction with these metallic oxides. Thiocarbanilide or N,N'-diphenyl-thiourea is an example of an accelerator which has been used heretofore in the vulcanization of natural rubber, while catechol derivatives and hexamethylenetetramine are examples of previously used accelerators in the vulcanization of polychloroprene. The accelerator which has proved most effective up to this time in the vulcanization of polychloroprene is ethylenethiourea. The heretofore known accelerators, including those mentioned above, either do not impart to the vulcanizate the desired physical properties or are too scorchy, i.e., they are so active at relatively low temperatures that the polychloroprene is liable to cure prematurely or "scorch" during processing and accordingly cause economic losses.

Accordingly, it is an object of the present invention to provide an accelerator for the vulcanization of chloroprene polymers and especially for the vulcanization of the chloroprene polymer known as neoprene type W which will impart to the vulcanizates physical properties which are comparable to those imparted by ethylenethiourea and which is less scorchy than ethylenethiourea, the best accelerator developed heretofore. It is a further object to provide an accelerator which is less expensive and easier to prepare than is ethylenethiourea.

The accelerator of the present invention having these desirable properties is a thio pyrimidine of the following structure and which can exist in two tautomeric forms as illustrated below.

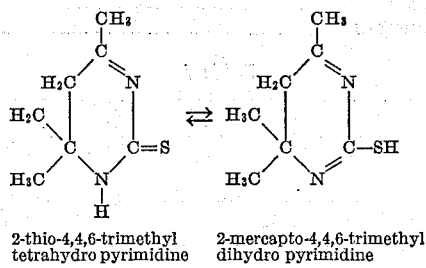

2-thio-4,4,6-trimethyl tetrahydro pyrimidine    2-mercapto-4,4,6-trimethyl dihydro pyrimidine The accelerator may be prepared by the following inexpensive and easy classical method involving the reaction of an alpha,beta-unsaturated ketone with thiourea:

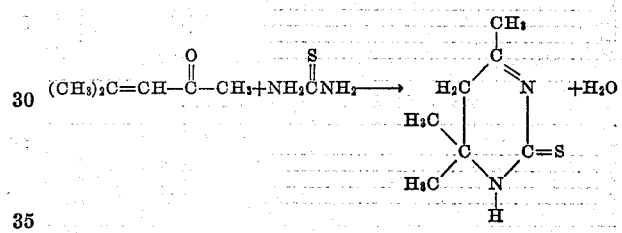

A further method for the preparation of the accelerator is set forth in Beilstein, volume 24, page 72.

The amount of the accelerator which is incorporated in the chloroprene polymer stock may vary within rather broad limits. In general, from about 0.05% to about 5.0% of the accelerator based on the weight of the chloroprene polymer is employed. It is preferred to use from about 0.5% to about 1.0% of the accelerator based on the weight of the chloroprene polymer present in the stock to be vulcanized.

The accelerator may be used in conjunction with conventional compounding ingredients used in the preparation of polychloroprene vulcanizates. Typical examples of such ingredients include antioxidants, metallic oxides, colors, softeners and peptizers, fillers and extenders, reinforcing materials and carbon blacks, and fatty acids and lubricants.

The invention will be further illustrated by the data pertaining to Examples 1 through 4 below.

Typical polychloroprenes, namely neoprene type W or neoprene type WRT, were compounded by milling together the ingredients in the Formulas A-D of the examples. In the formulas of the examples Age Rite Stalite is a proprietary antioxidant composition composed of octylated diphenylamines, and P-33 Black and Thermax are proprietary compositions of fine thermal carbon black, Neophax A is a proprietary factice composed of vulcanized vegetable oils, Plasticizer SC is a proprietary glycol ester of vegetable oil fatty acids, Circo light oil is a proprietary processed petroleum oil, and Silene EF is a proprietary grade of finely divided calcium silicate. The polychloroprene stock was vulcanized by press curing at 307° F. for varying lengths of time as set forth in the tables of the examples. The physical properties of the various vulcanizates, such as stress, tensile strength, elongation, and hardness were measured as well as the Mooney scorch values. The accelerator of the invention, i.e., 2-thio-4,4,6-trimethyl tetrahydro pyrimidine, was compared with the best previously known accelerator, namely ethylenethiourea.

EXAMPLE 1

Formula A

| Components: | Parts by weight |
|---|---|
| Neoprene type W | 100 |
| Stearic acid | 0.5 |
| Zinc oxide | 5 |
| Extra light calcined magnesium oxide | 2 |
| Age Rite Stalite | 2 |
| P-33 black | 75 |
| Accelerator | 0.5 |

Table I

| Press Cure in Minutes at 307° F. | 2-thio-4,4,6-trimethyl tetrahydro pyrimidine | Ethylene-thiourea |
|---|---|---|
| MOONEY SCORCH AT 250° F. (MINUTES TO 5 POINT RISE) | | |
|  | 10 | 6 |
| STRESS IN P.S.I. AT 300% ELONGATION | | |
| 10 | 1,090 | 1,420 |
| 20 | 1,360 | 1,660 |
| 30 | 1,510 | 1,740 |
| 45 | 1,590 | 1,830 |
| TENSILE STRENGTH IN P.S.I. | | |
| 10 | 2,150 | 2,180 |
| 20 | 2,350 | 2,300 |
| 30 | 2,480 | 2,390 |
| 45 | 2,480 | 2,450 |
| PERCENT ELONGATION AT BREAK | | |
| 10 | 630 | 550 |
| 20 | 520 | 490 |
| 30 | 480 | 490 |
| 45 | 460 | 470 |
| SHORE HARDNESS NO. | | |
| 10 | 57 | 60 |
| 20 | 60 | 62 |
| 30 | 60 | 63 |
| 45 | 60 | 63 |

EXAMPLE 2

Formula B

| Components: | Parts by weight |
|---|---|
| Neoprene type W | 100 |
| Neophax A | 20 |
| Age Rite Stalite | 0.5 |
| Petrolatum | 1 |
| Plasticizer SC | 25 |
| Extra light calcined magnesium oxide | 4 |
| Thermax | 25 |
| Dixie clay | 45 |
| Zinc oxide | 5 |
| Accelerator | 0.5 |

TABLE II

| Press Cure in Minutes at 307° F. | 2-thio-4,4,6-trimethyl tetrahydro pyrimidine | Ethylene-thiourea |
|---|---|---|
| MOONEY SCORCH AT 250° F. (MINUTES TO 5 POINT RISE) | | |
|  | 26 | 16 |
| STRESS IN P.S.I. AT 300% ELONGATION | | |
| 10 | 140 | 220 |
| 15 | 200 | 300 |
| 20 | 240 | 340 |
| 30 | 320 | 420 |
| 45 | 400 | 420 |
| TENSILE STRENGTH IN P.S.I. | | |
| 10 | 700 | 1,300 |
| 15 | 1,140 | 1,410 |
| 20 | 1,340 | 1,520 |
| 30 | 1,500 | 1,560 |
| 45 | 1,600 | 1,600 |
| PERCENT ELONGATION AT BREAK | | |
| 10 | 1,000 | 900 |
| 15 | 980 | 810 |
| 20 | 920 | 740 |
| 30 | 800 | 670 |
| 45 | 730 | 640 |
| SHORE HARDNESS NO. | | |
| 10 | 22 | 29 |
| 15 | 26 | 32 |
| 20 | 30 | 36 |
| 30 | 33 | 37 |
| 45 | 38 | 40 |

EXAMPLE 3

Formula C

Formula C is identical with Formula B in all respects except that 0.25 part of sulfur was added.

TABLE III

| Press Cure in Minutes at 307° F. | 2-thio-4,4,6-trimethyl tetrahydro pyrimidine | Ethylene-thiourea |
|---|---|---|
| MOONEY SCORCH AT 250° F. (MINUTES TO 5 POINT RISE) | | |
|  | 20 | 12 |
| STRESS IN P.S.I. AT 300% ELONGATION | | |
| 10 | 180 | 180 |
| 15 | 200 | 230 |
| 20 | 280 | 300 |
| 30 | 350 | 350 |
| 45 | 400 | 400 |
| TENSILE STRENGTH IN P.S.I. | | |
| 10 | 1,210 | 1,310 |
| 15 | 1,380 | 1,390 |
| 20 | 1,570 | 1,440 |
| 30 | 1,580 | 1,500 |
| 45 | 1,580 | 1,490 |
| PERCENT ELONGATION AT BREAK | | |
| 10 | 1,000 | 910 |
| 15 | 880 | 800 |
| 20 | 800 | 760 |
| 30 | 740 | 690 |
| 45 | 670 | 630 |
| SHORE HARDNESS NO. | | |
| 10 | 25 | 30 |
| 15 | 30 | 33 |
| 20 | 33 | 37 |
| 30 | 38 | 39 |
| 45 | 41 | 42 |

EXAMPLE 4

Formula D

| Components: | Parts by weight |
|---|---|
| Neoprene type WRT | 100 |
| Age Rite Stalite | 2 |
| Petrolatum | 1 |
| Circo light oil | 10 |
| Diethylene glycol | 4 |
| Silene EF | 50 |
| Zinc oxide | 5 |
| Extra light calcined magnesium oxide | 4 |
| Sulfur | 0.25 |
| Accelerator | (as shown in Table IV) |

TABLE IV

| Press Cure in Minutes at 307° F. | 2-thio-4,4,6-trimethyl tetrahydro pyrimidine 0.75 part | Ethylene-thiourea 0.5 part |
|---|---|---|
| MOONEY SCORCH AT 250° F. (MINUTES TO 5 POINT RISE) | | |
|  | 14 | 8 |
| STRESS IN P.S.I. AT 300% ELONGATION | | |
| 10 | 220 | 320 |
| 15 | 300 | 400 |
| 20 | 350 | 400 |
| 30 | 410 | 440 |
| 45 | 480 | 460 |
| TENSILE STRENGTH IN P.S.I. | | |
| 10 | 1,400 | 1,620 |
| 15 | 1,580 | 1,700 |
| 20 | 1,650 | 1,700 |
| 30 | 1,650 | 1,700 |
| 45 | 1,620 | 1,700 |
| PERCENT ELONGATION AT BREAK | | |
| 10 | 1,080 | 930 |
| 15 | 960 | 850 |
| 20 | 910 | 820 |
| 30 | 810 | 770 |
| 45 | 750 | 750 |
| SHORE HARDNESS NO. | | |
| 10 | 40 | 45 |
| 15 | 45 | 48 |
| 20 | 47 | 49 |
| 30 | 50 | 51 |
| 45 | 52 | 52 |

From a study of the data in Tables I through IV above it may be readily seen that the accelerator of the invention, 2-thio-4,4,6-trimethyl tetrahydro pyrimidine, cures a chloroprene polymer such as neoprene type W or neoprene type WRT. Moreover, the accelerator of the invention imparts to the vulcanizates physical properties comparable to those imparted thereto by ethylenethiourea, and most important, it is not nearly as scorchy as is ethylenethiourea as shown by the higher Mooney scorch value.

While the accelerator of the invention is of particular interest in the vulcanization of the chloroprene polymer known as neoprene type W, it will be appreciated that it is useful in the vulcanization of other chloroprene polymers one of which has been shown in the examples above.

Various modifications and changes may be made in the invention herein set forth without departing from the spirit thereof and accordingly the invention is to be limited only within the scope of the appended claims.

I claim:

1. A vulcanizable polychloroprene composition free from undesirable scorchy properties comprising an unvulcanized chloroprene polymer and from about 0.05% to about 5.0% of the weight of the polymer of an accelerator which is 2-thio-4,4,6-trimethyl tetrahydro pyrimidine.

2. A vulcanizable polychloroprene composition free from undesirable scorchy properties comprising an unvulcanized chloroprene polymer and from about 0.5% to about 1.0% of the weight of the polymer of an accelerator which is 2-thio-4,4,6-trimethyl tetrahydro pyrimidine.

3. A vulcanizable polychloroprene composition free from undesirable scorchy properties comprising a sulfur-free polychloroprene and from about 0.05% to about 5.0% of the weight of the polymer of an accelerator which is 2-thio-4,4,6-trimethyl tetrahydro pyrimidine.

4. A vulcanizable polychloroprene composition free from undesirable scorchy properties comprising a sulfur-free polychloroprene and from about 0.5% to about 1.0% of the weight of the polymer of an accelerator which is 2-thio-4,4,6-trimethyl tetrahydro pyridimine.

5. The process of vulcanizing chloroprene polymers comprising incorporating in a chloroprene polymer stock from about 0.05% to about 5.0% of the weight of the polymer of an accelerator which is 2-thio-4,4,6-trimethyl tetrahydro pyrimidine and heating at vulcanizing temperatures to cure the polymer.

6. The process of vulcanizing chloroprene polymers comprising incorporating in a chloroprene polymer stock from about 0.5% to about 1.0% of the weight of the polymer of an accelerator which is 2-thio-4,4,6-trimethyl tetrahydro pyrimidine and heating at vulcanizing temperatures to cure the polymer.

7. The process of vulcanizing chloroprene polymers comprising incorporating in a sulfur-free polychloroprene stock from about 0.05% to about 5.0% of the weight of the polymer of an accelerator which is 2-thio-4,4,6-trimethyl tetrahydro pyrimidine and heating at vulcanizing temperatures to cure the polymer.

8. The process of vulcanizing chloroprene polymers comprising incorporating in a sulfur-free polychloroprene stock from about 0.5% to about 1.0% of the weight of the polymer of an accelerator which is 2-thio-4,4,6-trimethyl tetrahydro pyrimidine and heating at vulcanizing temperatures to cure the polymer.

References Cited in the file of this patent

UNITED STATES PATENTS

| 2,234,848 | Ter Horst | Mar. 11, 1941 |
| 2,525,200 | Bergmann | Oct. 10, 1950 |
| 2,544,746 | Baum | Mar. 13, 1951 |

OTHER REFERENCES

Beilstein: vol. 24, p. 72 (1936). (Copy in Library.)